US012364972B2

(12) United States Patent
Kim et al.

(10) Patent No.: US 12,364,972 B2
(45) Date of Patent: Jul. 22, 2025

(54) VANADIUM PENTOXIDE-TUNGSTEN TRIOXIDE CATALYST SUPPORTED ON IRON ION-EXCHANGED TITANIUM DIOXIDE AND METHOD FOR REMOVING NITROGEN OXIDES USING THE SAME

(71) Applicant: Industry Academic Cooperation Foundation, Daegu University of, Gyeongsan-si (KR)

(72) Inventors: Moon Hyeon Kim, Gyeongsan-si (KR); Yong Seok Hong, Sejong-si (KR); Ki Hyuck Yang, Gyeongsan-si (KR); Thi Phuong Thao Nyguen, Gyeongsan-si (KR)

(73) Assignee: INDUSTRY ACADEMIC COOPERATION FOUNDATION, DAEGU UNIVERSITY, Gyeongsan-si (KR)

( * ) Notice: Subject to any disclaimer, the term of this patent is extended or adjusted under 35 U.S.C. 154(b) by 442 days.

(21) Appl. No.: 17/936,840

(22) Filed: Sep. 29, 2022

(65) Prior Publication Data
US 2023/0023728 A1 Jan. 26, 2023

Related U.S. Application Data

(63) Continuation of application No. PCT/KR2021/004117, filed on Apr. 2, 2021.

(30) Foreign Application Priority Data

Jun. 5, 2020 (KR) .................. 10-2020-0068295

(51) Int. Cl.
*B01J 23/30* (2006.01)
*B01D 53/86* (2006.01)
(Continued)

(52) U.S. Cl.
CPC .......... *B01J 23/30* (2013.01); *B01D 53/8628* (2013.01); *B01J 23/745* (2013.01); *B01J 37/30* (2013.01);
(Continued)

(58) Field of Classification Search
CPC . B01J 23/30; B01J 23/745; B01J 37/30; B01J 21/063; B01J 37/0036;
(Continued)

(56) References Cited

U.S. PATENT DOCUMENTS 5,589,147 A * 12/1996 Farnos .................. B01J 29/072
423/239.2
7,485,276 B2 2/2009 Schwefer et al.
10,022,669 B2 7/2018 Schwefer et al.

FOREIGN PATENT DOCUMENTS

EP 3689441 8/2020
KR 10-2000-0013127 3/2000
(Continued)

OTHER PUBLICATIONS

Gongshin Qi et al., "Selective catalytic oxidation (SCO) of ammonia to nitrogen over Fe-exchanged zeolites prepared by sublimation of FeCl3", Journal of Catalysis, 2004, vol. 226, pp. 120-128, Aug. 2004.
(Continued)

*Primary Examiner* — Anthony J Zimmer
*Assistant Examiner* — Jaanzeb C Raja
(74) *Attorney, Agent, or Firm* — LEX IP MEISTER, PLLC

(57) ABSTRACT

The present invention pertains to: a vanadium pentoxide-tungsten trioxide catalyst supported on an iron ion-exchanged titanium dioxide; and a method for removing nitrogen oxides using the same. More specifically, the present invention pertains to: a deNO$_x$ing catalyst in which the
(Continued)

iron ion-exchanged titanium dioxide is utilized as a support for the vanadium pentoxide and tungsten trioxide to drastically reduce the generation and emission of nitrous oxide; and a method for removing nitrogen oxides using the same.

10 Claims, 2 Drawing Sheets

(51) Int. Cl.
*B01J 23/745* (2006.01)
*B01J 37/30* (2006.01)

(52) U.S. Cl.
CPC .............. *B01D 2255/20723* (2013.01); *B01D 2255/20776* (2013.01)

(58) Field of Classification Search
CPC .. B01J 37/0203; B01J 37/0207; B01J 23/888; B01D 53/8628; B01D 2255/20776; B01D 2255/20707; B01D 2255/20738; B01D 2257/404; B01D 2258/0283; Y02C 20/10
See application file for complete search history.

(56) References Cited

FOREIGN PATENT DOCUMENTS

| KR | 10-0723819 | 6/2007 |
| KR | 10-0973675 | 8/2010 |
| KR | 10-2017-0098593 | 8/2017 |
| KR | 10-1925106 | 12/2018 |
| KR | 10-1933227 | 12/2018 |
| KR | 10-2183166 | 11/2020 |

OTHER PUBLICATIONS

Thi Phuong Thao Nguyen et al., "Selective catalytic reduction of NO by NH3 over Fe2O3-promoted V2O5/TiO2-based catalysts with high Fe2O3-to-V2O5 ratios", Catalysis Today, vol. 360, pp. 305-316, Feb. 2020.

Oliver Kröcher et al., "Combination of V2O5/WO3—TiO2, Fe-ZSM5, and Cu-ZSM5 Catalysts for the Selective Catalytic Reduction of Nitric Oxide with Ammonia", Industrial & Engineering Chemistry Research, 47, 8588-8593, Oct. 2008.

Moon Hyeon Kim et al., "Selective reduction of NO by NH3 over Fe-zeolite-promoted V2O5—WO3/ TiO2-based catalysts: Great suppression of N2O formation and origin of NO removal activity loss", Catalysis Communications 86, 2016, 82-85, Aug. 2016.

Ruihua Gao et al., "Enhanced catalytic performance of V2O5—WO3/Fe2O3/ TiO2 microspheres for selective catalytic reduction of NO by NH3", Catalysis Science & Technology, 2013, 3, 191-199, Aug. 2012.

Moon Hyeon Kim et al., "The Role of Fe2O3 Species in Depressing the Formation of N2O in the Selective Reduction of NO by NH3 over V2O5/TiO2-Based Catalysts", Catalysts 2018, 8, 134, Mar. 2018.

Thi Phuong Thao Nguyen et al., "Formation and depression of N2O in selective reduction of NO by NH3 over Fe2O3-promoted V2O5-WO3/TiO2 catalysts: Roles of each constituent and strongly-adsorbed NH3 species", Catalysis Today, 2021, vol. 375, pp. 565-575, May 2020.

Thi Phuong Thao Nguyen et al., "Selective catalytic reduction of NO by NH3 over Fe2O3-promoted V2O5/TiO2-based catalysts with high Fe2O3-to-V2O5 ratios", Catalysis Today 360, 2021, 305-316, Feb. 2020.

* cited by examiner

[FIG. 1]
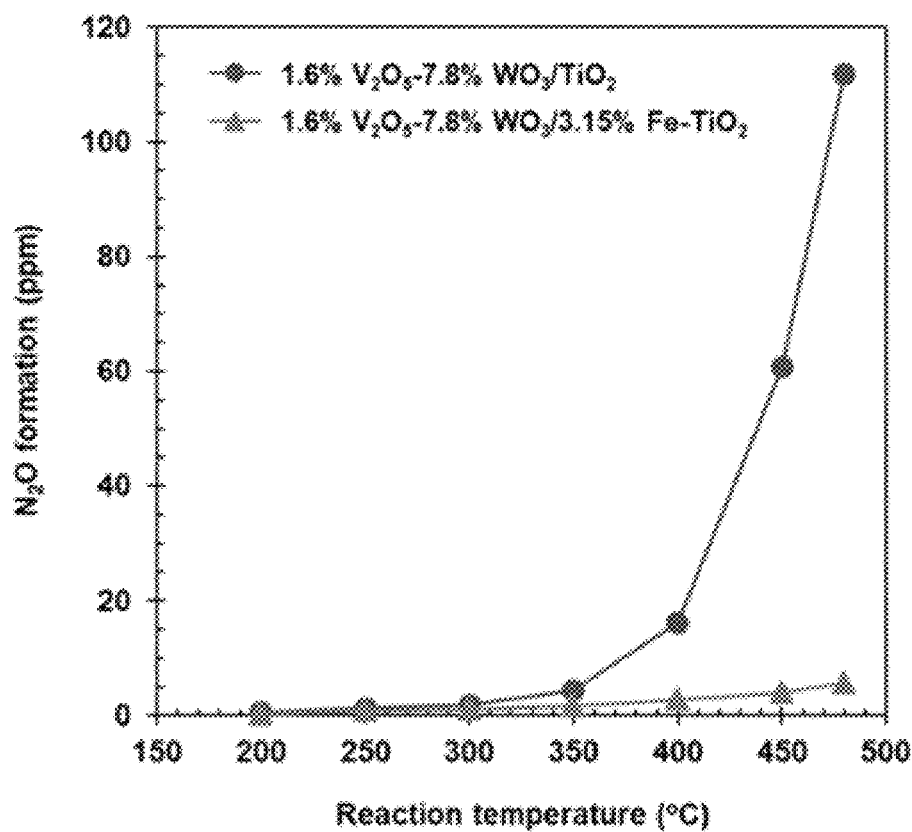

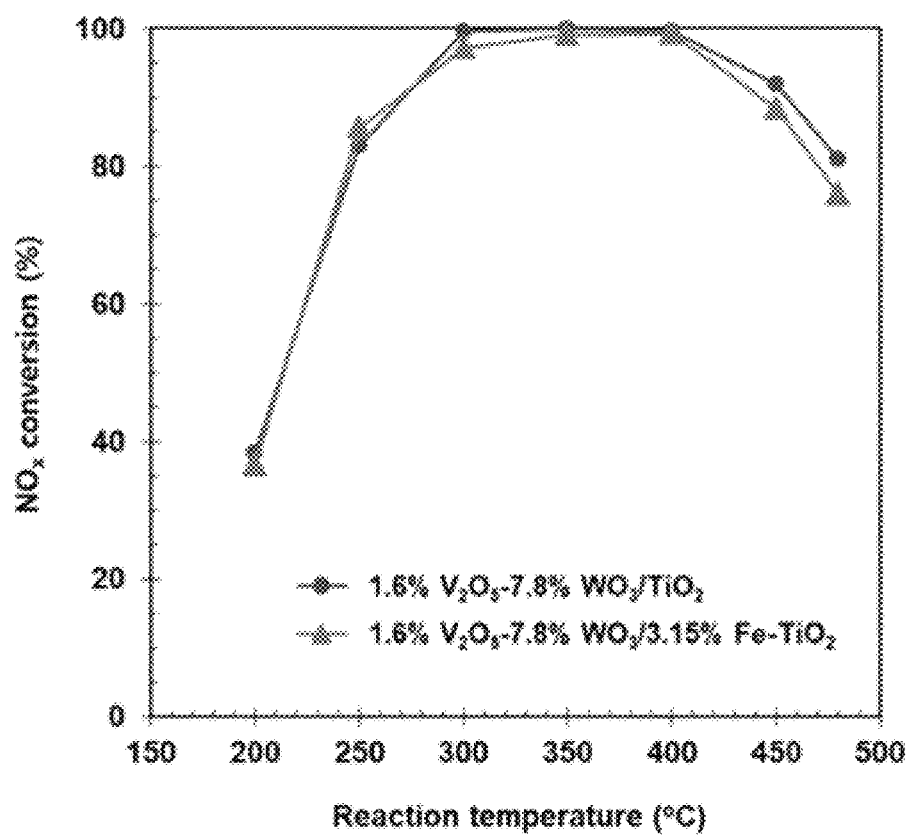
[FIG. 2]

VANADIUM PENTOXIDE-TUNGSTEN TRIOXIDE CATALYST SUPPORTED ON IRON ION-EXCHANGED TITANIUM DIOXIDE AND METHOD FOR REMOVING NITROGEN OXIDES USING THE SAME

TECHNICAL FIELD

The present invention relates to a vanadium pentoxide ($V_2O_5$)-tungsten trioxide ($WO_3$) catalyst supported on an iron ion-exchanged titanium dioxide and a method for removing nitrogen oxides ($NO_x$=$NO$+$NO_2$) using the same and, more specifically, to a deNO$_x$ing catalyst that dramatically reduces the formation and emission of nitrous oxide ($N_2O$) using the iron ion-exchanged titanium dioxide as a support of vanadium pentoxide and tungsten trioxide and a method for removing the $NO_x$.

BACKGROUND ART

Nitrogen oxides, which are mainly emitted from the combustion process of fossil fuels, such as coal, oil, and natural gas, and exist in the atmosphere, are one of the precursors to photochemical smog in metropolises. NO itself has a strong toxic effect on the human respiratory system and produces more toxic photochemical oxidants via photochemical reactions in the atmosphere. Selective catalytic reduction (SCR) that utilizes ammonia ($NH_3$) or urea as a reducing agent has been most widely adopted to control $NO_x$ emissions in large-scale stationary sources, such as thermal power plants, industrial boilers, waste incinerators, etc.

SCR technology capable of effectively removing $NO_x$ existing in flue gases with large volumetric flow rates, using $NH_3$ or urea as a reducing agent (typically called $NH_3$—SCR or urea-SCR) mostly adopts $V_2O_5$—$WO_3$/$TiO_2$ and $V_2O_5$—$MoO_3$/$TiO_2$ catalysts. In $NO_x$—$NH_3$—$O_2$ reaction over the SCR deNO$_x$ing catalysts, a significant amount of $N_2O$ is emitted as a byproduct.

$N_2O$ is one of the six kinds of greenhouse gases ($CO_2$, $CH_4$, $N_2O$, HFCs, PFCs, $SF_6$) which have been well known to cause global warming. The $CO_2$ has a global warming potential (GWP) of 1 whereas $N_2O$ has a GWP of 310. Thus, the contribution of $N_2O$ to the extent of the global warming is 310 times that of $CO_2$, at the same concentration level.

Accordingly, many areas including the United States and the European Union have regulated greenhouse gases emissions including $N_2O$. South Korea has adopted the greenhouse gas emissions trading scheme to regulate greenhouse gas emissions, such as $CO_2$ and $N_2O$.

Many studies have reported a catalyst and method to minimize the formation of $N_2O$ in $NH_3$—SCR processes. Krocher and Elsener, Ind. Eng. Chem. Res., 47 (2008) 8588, reported a configuration of $V_2O_5$—$WO_3$/$TiO_2$ and Fe-ZSM-5 for lowering $N_2O$ production levels in $NH_3$—SCR reaction. A series combination of the Fe-ZSM-5 following the former catalyst had a suppressible effect on the $N_2O$ formation; however, low $NO_x$ efficiencies were shown irrespective to the packing order, compared to those of the supported $V_2O_5$-based catalyst. One research group of applicants, Catal. Commun., 86 (2016) 82, proposed Fe-ZSM-5-coated $V_2O_5$—$WO_3$/$TiO_2$ catalysts which could greatly suppress $N_2O$ formation but caused a significant decrease in NO removal activity almost at all reaction temperatures depending on the coating content. According to a study of 1% $V_2O_5$-10% $WO_3$ dispersed on $Fe_2O_3$/$TiO_2$ with the $Fe_2O_3$ amounts of 1-5% by Zhang and coworkers, Catal. Sci. Technol., 3 (2013) 191, all these catalysts showed a less $N_2O$ formation at temperatures >450° C., compared to the bare $TiO_2$-supported catalyst. Recent reports by Kim and coworkers, Catalysts, 8 (2018) 134, Catal. Today, 360 (2021) 305 and 375 (2021) 565, studied effects on $N_2O$ production levels in $NH_3$—SCR reaction at 200-480° C. over $V_2O_5$—$WO_3$/$TiO_2$ catalysts onto which $Fe_2O_3$ with different moieties had been added. This attempt could yield a great depression of the $N_2O$ formation at high temperatures >400° C. at which a significant decrease in deNO$_x$ing efficiency was however shown, depending on the iron oxide loading.

EP3689441A1 is directed to a process of reducing $NO_x$ in a source gas, comprising passing the gas over a catalyst suitable for selective catalytic reduction of $NO_x$ and in the presence of a reducing agent, wherein the catalyst is a ferrierite (FER) zeolite which is not loaded with iron and is not loaded with any transition metal. This process can comprise passing the gas over an $N_2O$ decomposition catalyst in at least one deN$_2$O stage which is before or after a deNO$_x$ stage. The simultaneous removal of $N_2O$ and $NO_x$ is performed in at least one catalyst bed containing the catalyst which is not loaded with iron and transition metals.

KR10-1933227 by Shell Internationale Research Maatschappij B.V. describes a method of removing $N_2O$ in an $N_2O$-containing gas stream. Wherein said method mainly comprises heating the gas stream at a heat exchange region and decomposing the $N_2O$ by contacting the gas stream with an $N_2O$ decomposition catalyst which utilizes zeolites with a noble metal selected from the group of ruthenium, rhodium, silver, rhenium, osmium, iridium, platinum and gold, and with a transition metal selected from the group of vanadium, chromium, manganese, iron, cobalt, nickel and copper.

Disclosed in U.S. Pat. No. 7,485,276B2 and KR10-0723819B1 by ThyssenKrupp Industrial Solutions AG is a method for removing $NO_x$ and $N_2O$ from a residual gas stream in nitric acid production process. The method comprises a deNO$_x$ing stage in which the $NO_x$ is removed by an $NH_3$—SCR process and then a secondary deN$_2$O stage in which a gas stream containing $NO_x$ and $N_2O$ with an $NO_x$/$N_2O$ ratio of 0.001-0.5 is contacted with a catalyst at gas temperatures ranging from 350-500° C. to reduce the $N_2O$ with a further removal of NO wherein the catalyst is Fe-zeolites, preferably Fe-ZSM-5.

KR10-1925106 relates to a simultaneous removal of $N_2O$ and $NO_x$ in a heat recovery catalytic reactor with a catalyst packed bed. A gas stream containing $N_2O$ and $NO_x$ passes through the reactor at 320-450° C. wherein the pollutants are removed by selective catalytic reduction with $NH_3$ in the catalyst bed which is packed with the prior art catalysts.

Provided in U.S. Pat. No. 10,022,669B2 by ThyssenKrupp Industrial Solutions AG is a process for removing $N_2O$ and $NO_x$ from off gases. According to the invention, the process comprises catalytic decomposition of the $N_2O$ by means of iron-containing zeolite catalysts (deNO$_x$ stage) and catalytic reduction of the $NO_x$ by means of reducing agents (deN$_2$O stage) which is placed upstream of the deNO$_x$ stage. This staged combination can allow the downstream deNO$_x$-ing process to be operated under optimal conditions.

Conventional $V_2O_5$—$WO_3$/$TiO_2$ catalysts which have been commercially proven in a variety of deNO$_x$ applications can generate significant concentrations of $N_2O$ having the high GWP value in $NH_3$—SCR deNO$_x$ing processes. Many efforts have been devoted to develop new catalysts for depressing such an $N_2O$ formation and methods of using the same in the related industries and academic institutions to date. Some Fe-ZSM-5- and $Fe_2O_3$-promoted $V_2O_5$/$TiO_2$- based catalysts could appreciably lower the extent of the formation of $N_2O$ in $NH_3$—SCR reaction but gave an adverse effect on $NO_x$ removal activity, as stated previously. Of course, a suitable catalyst for removing $N_2O$ can be installed downstream of deNO$_x$ing processes, similar to a concept of the staged $NO_x/N_2O$ removal described in the aforementioned patents. However, this requires additionally a deN$_2$O catalyst.

DETAILED DESCRIPTION OF THE INVENTION

Technical Problem

To address the foregoing issues, an objective of the present invention is to provide a vanadium pentoxide-tungsten trioxide deNO$_x$ing catalyst supported on an iron ion-exchanged titanium dioxide, which has been utilized as a support for vanadium pentoxide and tungsten trioxide to dramatically reduce $N_2O$ formation and emissions, and a method for removing nitrogen oxides using the same.

Another objective of this invention is to provide the iron ion-exchanged titanium dioxide-supported vanadium pentoxide-tungsten trioxide deNO$_x$ing catalyst whose deNO$_x$ing performance is, even with its primary role for the depression of $N_2O$ formation and emissions, comparable to those of commercial deNO$_x$ing catalysts, and a method for removing $NO_x$ using the same.

Technical Solution

In the present invention to achieve the foregoing objectives, a catalyst to selectively remove nitrogen oxides from stationary sources by $NH_3$ or urea as a reducing agent relates to an iron ion-exchanged titanium dioxide-supported vanadium pentoxide-tungsten trioxide catalyst. Herein, the iron ion-exchanged titanium dioxide support is characterized by modifying and functionalizing the surface of a titanium dioxide, mixing with a precursor of iron ions and then exchanging with the iron ions at a sublimation temperature using an ion exchange technique.

The iron ions are divalent iron ions.

The surface of the titanium dioxide is functionalized with hydroxyl groups.

The ion exchange technique is a solid-state ion exchange.

The iron ions are included at 0.5 to 5 wt % with respect to the titanium dioxide.

The vanadium pentoxide is included at 0.2 to 3 wt % with respect to the titanium dioxide.

The tungsten trioxide is included at 2 to 30 wt % with respect to the titanium dioxide.

The catalyst can greatly lower a level of $N_2O$ produced as a byproduct in the $NO_x$ removal reaction.

Further, this invention provides a method for removing $NO_x$ using the vanadium pentoxide-tungsten trioxide deNO$_x$ing catalyst supported on the iron ions-exchanged titanium dioxide.

Effects of the Invention

As described above, according to the iron ions-exchanged titanium dioxide-supported vanadium pentoxide-tungsten trioxide deNO$_x$ing catalyst and the method for removing $NO_x$ using the same, it is possible to save operating expenses of deNO$_x$ing facilities since $N_2O$ formation and emissions are dramatically reduced thereby lowering unnecessary consumption of the reducing agents.

According to the vanadium pentoxide-tungsten trioxide deNO$_x$ing catalyst supported on the iron ion-exchanged titanium dioxide and the method for removing $NO_x$ using the same, although this invention has allowed the catalyst to primarily depress $N_2O$ formation and emissions, it is also possible to provide deNO$_x$ing performance that is comparable to that of commercial deNO$_x$ing catalysts.

BRIEF DESCRIPTION OF THE DRAWINGS

FIG. 1 is a graph showing $N_2O$ formation levels of a sample of a vanadium pentoxide-tungsten trioxide catalyst supported on the iron ion-exchanged titanium dioxide according to the present invention.

FIG. 2 is a graph showing deNO$_x$ing performance of a sample of a vanadium pentoxide-tungsten trioxide catalyst supported on the iron ions-exchanged titanium dioxide according to the present invention.

METHOD TO PRACTICE THE INVENTION

Specific features and advantages of the present invention will be described in detail with the drawings, embodiments, and comparative examples below. In the case that detailed descriptions of the functions and features regarding the present invention make the gist of this invention unclear, embodiments will substitute for them.

The present invention relates to a vanadium pentoxide-tungsten trioxide catalyst supported on an iron ion-exchanged titanium dioxide and a method for removing $NO_x$ using the same, and more specifically, to a deNO$_x$ing catalyst that dramatically reduces the formation and emission of $N_2O$ using the iron ion-exchanged titanium dioxide as a support of vanadium pentoxide and tungsten trioxide and a method for removing $NO_R$.

The deNO$_x$ing catalyst may be a $V_2O_5$—$WO_3$/$TiO_2$ containing tungsten trioxide as a promoter or a $V_2O_5$/$TiO_2$ without the promoter. However, considering the durability and activity of the catalyst, it is preferable that tungsten trioxide as a promoter is contained.

The titanium dioxide is not limited, if commonly used in the technical field of $NO_x$ removal, to a specific one, and would more preferably be an anatase-type titanium dioxide rather than a rutile-type one. Anatase-type titanium dioxide, whose band gap between the valence and conduction bands is relatively large compared to that of rutile-type titanium dioxide, possesses a high redox potential and is relatively more able to stably maintain the dispersion of the catalyst components.

An iron ion-exchanged titanium dioxide support is prepared by introducing iron ions into a titanium dioxide, whose surface has been modified and functionalized, using an ion exchange method that allows the exchange between iron ions existing in their precursor and hydroxyl groups.

The surface of the titanium dioxide is modified and functionalized with the hydroxyl groups to enhance the ion exchange capacity of iron ions, prior to introducing the iron ions.

As a specific method for introducing hydroxyl groups onto the surface of the titanium dioxide, this is treated in an ammonium hydroxide ($NH_4OH$) solution with a desired hydrogen ion concentration (pH). However, any method for introducing the hydroxyl groups onto the surface of the titanium dioxide can be utilized without a limitation.

Then, iron ions are exchanged with the hydroxyl groups in the functionalized titanium dioxide thereby significantly reducing the formation of $N_2O$ itself, generating the active sites, on which the removal reaction of the $N_2O$ may occur independent of the deNO$_x$ing reaction, and reducing $N_2O$ via reaction between $N_2O$ formed and $NH_3$ adsorbed on the catalyst surface in the deNO$_x$ing reaction.

In other words, the method of the present invention is not a method for removing $N_2O$ formed and emitted already as in the prior art $N_2O$ reduction technology. Not only can the method suppress $N_2O$ formation itself on the surface of the deNO$_x$ing catalyst, but it can also decompose $N_2O$ at the active sites of the iron ions-exchanged titanium dioxide or reduce $N_2O$ using excessive $NH_3$ residues on the catalyst surface before the $N_2O$ is desorbed and emitted when a small amount has been formed on the surface of the catalyst.

The introduction of iron ions onto the titanium dioxide functionalized with hydroxyl groups can utilized the prior art method. As a specific example, one of solid-state ion exchange and wet ion exchange methods can be utilized. Preferably, the solid-state ion exchange method can be applied.

The solid-state ion exchange method mechanically and completely mixes an iron ion precursor with the functionalized titanium dioxide at room temperature, removes oxygen and moisture remaining in the mixture by pretreating it under heated conditions and a flow of an inert gas ($N_2$, Ar, He, etc.) for a sufficient time, and then allows an exchange of iron ions on the surface of the functionalized titanium dioxide through a solid-state reaction between the iron ions and the hydrogen ions in the hydroxyl groups at temperatures that are equal to or higher than the sublimation temperature of the precursor of the iron ions.

As the precursor of the iron ions, salts in the form of chloride (chlorine salt), nitrate, sulfate, phosphate, carbonate, and derivatives thereof may be used, and preferably, chloride salts that do not cause the deposition of anionic salts on the surface of the titanium dioxide may be primarily used.

In this case, the iron ions may be exchanged to be included in an amount of 0.5 to 5 wt % with respect to the titanium dioxide. In the case that the iron ions are exchanged in an amount less than 0.5 wt % with respect to the titanium dioxide, it is difficult to expect the removal of $N_2O$ and its emission reduction since the surface density of the catalytically active sites in which the $N_2O$ removal reaction may occur. In the case that the iron ions exceed 5 wt % with respect to the titanium dioxide, iron oxides (FeO$_x$) may be formed on the surface of the titanium dioxide and it is difficult to expect a reduction in $N_2O$ emissions. Therefore, it is preferable in the above range.

Precursors of vanadium pentoxide are selected without limitation so long as they are commonly used as a main active component for the removal of NO$_x$ in the deNO$_x$ing process.

In this case, the content of the vanadium pentoxide supported on the iron ion-titanium dioxide is not particularly limited so long as it is in the range of the content being normally loaded in the art. The vanadium pentoxide is included at 0.2 to 3 wt % with respect to the iron ion-titanium dioxide. In the case that the content of the vanadium pentoxide is less than 0.2 wt %, sufficient deNO$_x$ing performance cannot be obtained, and in the case of exceeding 3 wt %, the formation of $N_2O$ greatly increases due to $NH_3$ oxidation in a high temperature region of 350° C. or higher. Therefore, it is preferable in the above range.

Tungsten trioxide is added as a promoter to prevent the phase transition of titanium dioxide and to enhance its surface acidity. Further, the tungsten trioxide plays a role in depressing the oxidation of sulfur dioxide ($SO_2$) thereby enhancing the durability of the catalyst and not only for enhancement in the dispersion of vanadium pentoxide but also for the suppression of its sintering. The tungsten trioxide may be, to a different content, loaded into the deNO$_x$ing catalyst of the present invention depending on the compositions of flue gases.

In this case, the tungsten trioxide may be included in an amount of 2 to 30 wt % with respect to the iron ion-titanium dioxide. If the tungsten trioxide is added at less than about 2 wt %, it is difficult to expect the aforementioned effects, while in the case of exceeding about 30 wt %, not only the particle size of the tungsten trioxide increases, but the effective supporting of vanadium pentoxide may also be limited. Thereby, the surface structure of tungsten trioxide and vanadium pentoxide promotes side reactions, i.e., the oxidation of $NH_3$ and of $SO_2$ into sulfur trioxide ($SO_3$). Therefore, it is effective in the aforementioned range. Preferably, the tungsten trioxide may be in the range of 3 to 10 wt % with respect to the iron ion-titanium dioxide.

The method for supporting vanadium pentoxide and tungsten trioxide on the iron ion-titanium dioxide can utilize techniques being commonly used in the art and is not particularly limited, e.g., the so-called wet impregnation technique may be used. As a specific example, a 5 wt % oxalic acid ($H_2C_2O_4$) solution is prepared, and ammonium metatungstate (($NH_4)_6H_2W_{12}O_{40}$), which is the precursor of tungsten trioxide, is put into the solution and completely dissolved. An iron ion-titanium dioxide support is put into the prepared precursor solution, the metatungstate is impregnated on the support under stirring in a vacuum rotary evaporator, and tungsten trioxide on the surface of the iron ion-titanium dioxide support (tungsten trioxide/iron-titanium dioxide) is formed by drying, and calcination at 400 to 600° C. After this, an aqueous solution of ammonium metavanadate ($NH_4VO_3$) is prepared, similar to the preparation of the ammonium metatungstate solution. The tungsten trioxide/iron ion-titanium dioxide catalyst is put into that solution and mixed thoroughly, followed by drying and calcination in a manner similar to that described above, thereby resulting in a vanadium pentoxide-tungsten trioxide/iron ion-titanium dioxide catalyst.

In this case, as described above, the content of the tungsten trioxide loaded into the deNO$_x$ing catalyst of the present invention can be varied. Unlike the aforementioned impregnation order, the support can be sequentially impregnated with precursor solutions of vanadium pentoxide and tungsten trioxide or it is safe to simultaneously impregnate the support with each solution dissolving the two precursors separately. Alternatively, it is possible for the impregnation to be simultaneously conducted by putting and dissolving the two precursors in an oxalic acid solution at once.

A method for removing NO$_x$ according to the present invention is described below.

The NO$_x$ removal method according to the present invention utilizes a vanadium pentoxide-tungsten trioxide deNO$_x$-ing catalyst supported on the iron ion-exchanged titanium dioxide. When applying the deNO$_x$ing catalyst according to the present invention to the NO$_x$ removal reaction, the reaction temperature is in the range of 150 to 700° C., preferably 150 to 600° C., and within this temperature range, it is possible to achieve superior NO$_x$ removal activity and prevent excess formation of $N_2O$.

Gas hourly space velocities (GHSV) are not particularly limited, however, these are preferable 2000 to 500,000 h$^{-1}$ based on the catalyst powder, more preferably 10,000 to 300,000 h$^{-1}$. If the space velocity is less than 10,000 h$^{-1}$, catalytic activity is excellent but catalyst costs become excessively large since necessary volumes of the catalyst increase. If the space velocity exceeds 300,000 $h^{-1}$, it is difficult to expect deNO$_x$ing performances to the level required in the industrial field.

Oxygen concentrations in reactant gases for the catalytic reaction may be maintained at 0.1 to 21 vol %, preferably 1 to 15 vol %, but that is not particularly limited.

Hereinafter, the present invention is described in detail with references and embodiments thereof. However, the following embodiments are to specifically illustrate the present invention rather than being limited thereto.

1. Preparation of an Iron Ion-Exchanged Titanium Dioxide Support

A method for preparing an iron ion-exchanged titanium dioxide (iron ion-titanium dioxide) for supporting vanadium pentoxide and tungsten trioxide to dramatically reduce $N_2O$ formation levels of a vanadium pentoxide/titanium dioxide-based catalyst in an $NH_3$—SCR deNO$_x$ing reaction in the present invention is as follows.

150 g of titanium dioxide dried at 110° C. for 8 hours was slowly put into a solution which had been adjusted to a pH=11 by sparingly adding an ammonium hydroxide solution to 100 mL of distilled deionized water in a flat-bottom flask under stirring at 300 rpm, and was stirred at 600 rpm. After stirring for 2 hours, the pH of the mixture was measured using a pH meter, the ammonium hydroxide solution was again added sparingly so as to have the pH=11, and the mixture was continuously stirred for 8 hours and filtered through a filter paper.

The cake filtered on the filter paper was again put in a beaker, 1 L of distilled deionized water was added thereto, and after stirring at 600 rpm for 1 hour, this mixture was filtered again. The sample was washed by repeating the above filtration process until the pH of the filtrate is the same as that of the distilled water. The resulting cake was dried in a drying oven at 110° C. for 12 hours and was powdered, and was designated as "H—TiO$_2$."

10 g of the H—TiO$_2$ and an amount of ferrous chloride (FeCl$_2$) corresponding to a desired content of iron ions were put in a vial and mixed using a ball mill for 2 hours. This mixture was put in a quartz reactor, treated in a flow of 100 cm$^3$/min of nitrogen for 8 hours, heated to a desired sublimation temperature (200 to 550° C.) at a temperature ramping rate of 3° C./min and then maintained at the chosen temperature for 5 hours to perform solid-state ion exchange. After this process was completed, the sample was recovered and made into a powder again. The iron ion-exchanged titanium dioxide supports were designated as x % Fe—TiO$_2$-n in the following embodiments, where x denotes the wt % of the iron ions, and n denotes the sublimation temperature at which the solid-state ion exchange was conducted.

2. Preparation of Vanadium Pentoxide-Tungsten Trioxide/Iron Ion-Titanium Dioxide deNO$_x$ing Catalysts The method for preparing supported tungsten trioxide and vanadium pentoxide catalysts in the present invention is as follows. As a representative example, a method for impregnating a 3.15% Fe—TiO$_2$-200 support with the active substances is described in detail.

10 g of 3.15% Fe—TiO$_2$-200 is put in a vial and then dried in a drying oven at 110° C. for about 8 hours. 14 mL of distilled water was put in a beaker, an amount of ammonium metatungstate corresponding to a desired content of tungsten trioxide was accurately measured and completely dissolved, and the dried 3.15% Fe—TiO$_2$-200 and the precursor solution were put in a round flask and well mixed at 120 rpm using a vacuum rotary evaporator for 1 hour. After this, a residual solution was completely evaporated by operating a vacuum pump equipped with an evaporator, and the sample was recovered, dried in a drying oven at 110° C. for 8 hours, and then calcined at 500° C. for 1 hour in a quartz reactor.

5 g was sampled from a vial in which the tungsten trioxide-impregnated iron ion-titanium dioxide catalyst (7.8% WO$_3$/3.15% Fe—TiO$_2$-200) prepared as described above was stored. After a 5-wt % oxalic acid solution was made by dissolving oxalic acid in 14 mL of distilled water, an amount of ammonium metavanadate corresponding to 1.6 wt % vanadium pentoxide was put into the solution and completely dissolved. Both the aforementioned catalyst and the vanadium precursor solution were put in a round flask and mixed well for 1 hour at 120 rpm by using a vacuum rotary evaporator. After evaporating a residual solution, it was put in a drying oven, dried at 110° C. for 8 hours and calcined at 500° C. for 1 hour, thereby obtaining a 1.6% V$_2$O$_5$-7.8% WO$_3$/3.15% Fe—TiO$_2$-200 catalyst.

Catalysts having different contents of iron ions, tungsten trioxide, and vanadium pentoxide used in the embodiments of the present invention were prepared in the same manner as that described above.

3. Evaluations of $N_2O$ Reduction and NO$_x$ Removal 0.4 g of each catalyst was loaded into a quartz reactor and calcined again at 500° C. for 1 hour in a flow of a flowing mixture of 21 vol % oxygen and 79 vol % nitrogen at 1 L/min. After lowering the temperature of the catalyst bed to 200° C. and reducing the oxygen concentration to 5 vol %, 500 ppm nitrogen monoxide (NO) and 500 ppm NH$_3$ were added to the reaction gas.

The gas flow corresponding to a space velocity of 76,200 $h^{-1}$ based upon the amount of the catalyst used and the total flow rate was passed through the catalyst bed while allowing them to react at desired reaction temperatures (200 to 480° C.). After the reaction at each reaction temperature, concentrations of $N_2O$ formed and unreacted NO and NH$_3$ were measured by Fourier transform infrared spectroscopy (FT-IR). The gas flowing tube and gas cell were heated to 175° C. to prevent the gas-phase reactions between the reactants and the condensation of moisture generated in the catalytic reaction, and 15 L/min of dry air from which moisture had been completely removed was continuously flowed into the interior of the FT-IR to exclude the influence of moisture. The purities of NO and NH$_3$ used in the present invention were 99.99 vol % and 99.999 vol %, respectively. Concentrations of $N_2O$ and NO were calculated by using a calibration curve expressed as each gas-phase concentration vs. the area of a corresponding characteristic peak in the spectrum obtained by FT-IR, and the NO removal efficiency was estimated as the ratio of the concentration of NO remaining after the reaction to the initial concentration.

In summary, the evaluations of $N_2O$ reduction performance and deNO$_x$ing efficiency of catalysts and reference ones belonging to the present invention were conducted under NH$_3$—SCR reaction conditions including 5 vol % oxygen, 500 ppm NH$_3$, 500 ppm NO, and a space velocity of 76,200 $h^{-1}$.

FIG. 1 and FIG. 2 show the $N_2O$ formation level and deNO$_x$ing efficiency of 1.6 wt % vanadium pentoxide-7.8 wt % tungsten trioxide catalyst (1.6% V$_2$O$_5$-7.8% WO$_3$/3.15% Fe—TiO$_2$-200) supported on the iron ion-exchanged titanium dioxide according to the present invention (Embodiment 1 of Table 1).

Embodiment 1

In Table 1, $N_2O$ formation levels and deNO$_x$ing performance over a 1.6% V$_2$O$_5$-7.8% WO$_3$/3.15% Fe—TiO$_2$-200 catalyst were compiled as a function of reaction temperature. Even at a reaction temperature of 480° C., the concentration of $N_2O$ formation over the catalyst was only 5 ppm. The deNO$_x$ing performance of the catalyst was found to be 85% or more at a reaction temperature of 250 to 450° C.

TABLE 1

| Embodiment | Catalyst | DeNO$_x$ing efficiency (%) Reaction temperature (° C.) | | | | | | | Nitrous oxide concentration (ppm) Reaction temperature (° C.) | | | | | | |
|---|---|---|---|---|---|---|---|---|---|---|---|---|---|---|---|
| | | 200 | 250 | 300 | 350 | 400 | 450 | 480 | 200 | 250 | 300 | 350 | 400 | 450 | 480 |
| 1 | 1.6% V$_2$O$_5$-7.8% WO$_3$/3.15% Fe—TiO$_2$-200 | 36 | 85 | 97 | 99 | 100 | 89 | 75 | 0 | 0 | 0 | 0 | 2 | 4 | 5 |

In FIGS. 1 and 2, as a comparison group to compare the formation levels of nitrous oxide in regard to whether or not the introduction of iron ions into a titanium dioxide, N$_2$O formation levels, and deNO$_x$ing efficiency of a catalyst where vanadium pentoxide and tungsten trioxide had been, in the same amount as that described above, supported on the titanium dioxide without iron ion exchange (1.6% V$_2$O$_5$-7.8% WO$_3$/TiO$_2$) were also shown (Comparative Example 1 in Table 2).

Comparative Example 1

Table 2 shows N$_2$O formation levels and deNO$_x$ing performance of the 1.6% V$_2$O$_5$-7.8% WO$_3$/TiO$_2$ catalyst selected as a reference group of the present invention. This catalyst showed the formation of N$_2$O by a side reaction from 350° C. At 480° C., the amount formed was 110 ppm, which was much higher than that in Embodiment 1. At all temperatures, the deNO$_x$ing efficiency of the aforementioned catalyst was similar to the deNO$_x$ing performance of the catalyst in Embodiment 1.

TABLE 2

| Comparative Example | Catalyst | DeNO$_x$ing efficiency (%) Reaction temperature (° C.) | | | | | | | Nitrous oxide concentration (ppm) Reaction temperature (° C.) | | | | | | |
|---|---|---|---|---|---|---|---|---|---|---|---|---|---|---|---|
| | | 200 | 250 | 300 | 350 | 400 | 450 | 480 | 200 | 250 | 300 | 350 | 400 | 450 | 480 |
| 1 | 1.6% V$_2$O$_5$-7.8% WO$_3$/TiO$_2$ | 38 | 83 | 100 | 100 | 100 | 92 | 81 | 0 | 0 | 0 | 5 | 15 | 60 | 110 |

As illustrated in FIGS. 1 and 2 and compiled in Embodiment 1 and Comparative Example 1, when the iron ion-exchanged titanium dioxide support was applied to prepare the deNO$_x$ing catalyst, this maintained deNO$_x$ing performances comparable to those of the commercial deNO$_x$ing catalyst while it could dramatically reduce production levels of N$_2$O from side reactions.

Provided below are embodiments and comparative examples showing implementations of the present invention.

Comparative Examples 2 to 4

Comparative Examples 2 to 4 in Table 3 show N$_2$O formation levels and deNO$_x$ing performances of vanadium pentoxide/titanium dioxide-based catalysts chosen as the other references in the present invention. The 1.6% V$_2$O$_5$-7.8% WO$_3$/H—TiO$_2$ catalyst (Comparative Example 2) exhibited an N$_2$O formation level similar to that of 1.6% V$_2$O$_5$-7.8% WO$_3$/TiO$_2$ in high-temperature region, and 1.6% V$_2$O$_5$-7.8% WO$_3$/10% SiO$_2$—TiO$_2$ gave an N$_2$O formation exceeding 150 ppm at 480° C. (Comparative Example 4). The N$_2$O formation levels of the 1.6% V$_2$O$_5$-7.8% WO$_3$ catalyst supported on 3.16% Fe$_2$O$_3$/TiO$_2$ (Comparative Example 3) were much higher than that in the Embodiment 1.

TABLE 3

| Comparative Example | Catalyst | DeNO$_x$ing efficiency (%) Reaction temperature (° C.) | | | | | | | Nitrous oxide concentration (ppm) Reaction temperature (° C.) | | | | | | |
|---|---|---|---|---|---|---|---|---|---|---|---|---|---|---|---|
| | | 200 | 250 | 300 | 350 | 400 | 450 | 480 | 200 | 250 | 300 | 350 | 400 | 450 | 480 |
| 2 | 1.6% V$_2$O$_5$-7.8% WO$_3$/H—TiO$_2$ | 40 | 83 | 95 | 100 | 100 | 96 | 90 | 1 | 5 | 2 | 8 | 16 | 62 | 108 |
| 3 | 1.6% V$_2$O$_5$-7.8% WO$_3$/3.16% Fe$_2$O$_3$/TiO$_2$ | 37 | 78 | 97 | 100 | 96 | 75 | 58 | 0 | 1 | 2 | 3 | 6 | 21 | 40 |
| 4 | 1.6% V$_2$O$_5$-7.8% WO$_3$/10% SiO$_2$—TiO$_2$ | 25 | 50 | 70 | 80 | 95 | 70 | 62 | 0 | 0 | 0 | 8 | 20 | 65 | 160 |

As seen in the Embodiment 1 and Comparative Examples 1 to 4, it is seen that the formation of N$_2$O in NH$_3$—SCR reaction can be dramatically reduced by exchanging iron ions in the titanium dioxide prior to loading vanadium pentoxide and tungsten trioxide with desired amounts onto it.

Embodiments 2 to 5

As shown in Embodiments 2 to 5 in Table 4, it represented that the N$_2$O formation levels and deNO$_x$ing performances of the vanadium pentoxide-tungsten trioxide catalyst supported on the iron ion-exchanged titanium dioxide are influenced on the ion exchange temperature (sublimation temperature). In amounts of the vanadium pentoxide, tungsten trioxide, and iron ions that are all the same, the N$_2$O formation levels and deNO$_x$ing performances in the NH$_3$—SCR reaction were similar when the ion exchange temperature had been 200 to 550° C. (Embodiments 2 to 4).

TABLE 4

| Embodiment | Catalyst | DeNO$_x$ing efficiency (%) Reaction temperature (° C.) | | | | | | | Nitrous oxide concentration (ppm) Reaction temperature (° C.) | | | | | | |
|---|---|---|---|---|---|---|---|---|---|---|---|---|---|---|---|
| | | 200 | 250 | 300 | 350 | 400 | 450 | 480 | 200 | 250 | 300 | 350 | 400 | 450 | 480 |
| 2 | 1.6% V$_2$O$_5$-7.8% WO$_3$/3.15% Fe—TiO$_2$-300 | 36 | 85 | 92 | 97 | 100 | 87 | 73 | 0 | 0 | 0 | 0 | 2 | 5 | 6 |
| 3 | 1.6% V$_2$O$_5$-7.8% WO$_3$/3.15% Fe—TiO$_2$-400 | 36 | 85 | 93 | 95 | 100 | 86 | 72 | 0 | 0 | 0 | 0 | 3 | 6 | 7 |
| 4 | 1.6% V$_2$O$_5$-7.8% WO$_3$/3.15% Fe—TiO$_2$-550 | 34 | 85 | 92 | 95 | 100 | 87 | 72 | 0 | 0 | 0 | 3 | 5 | 8 | |
| 5 | 1.6% V$_2$O$_5$-7.8% WO$_3$/3.15% Fe—TiO$_2$-600 | 25 | 75 | 87 | 93 | 100 | 75 | 58 | 0 | 0 | 0 | 2 | 7 | 17 | 30 |

1.6% $V_2O_5$-7.8% $WO_3$/3.15% Fe—$TiO_2$-600 (Embodiment 5), which is a catalyst with the titanium dioxide exchanged by iron ions at 600° C., exhibited $N_2O$ formation levels of less than those of 1.6% $V_2O_5$-7.8% $WO_3$/$TiO_2$ (Comparative Example 1) but had larger $N_2O$ formations as well as lower deNO$_x$ing performances, compared to the catalysts ion-exchanged at lower sublimation temperatures. Thus, that temperature is inappropriate as a sublimation temperature for solid-state ion exchange.

Embodiments 6 to 10

According to Embodiment 1 in Table 1 and Embodiments 2 to 5 in Table 4, it is known that the $N_2O$ formation levels and deNO$_x$ing performances in the $NH_3$—SCR reaction are similar when the sublimation temperature for iron ions exchange was 200 to 550° C. Accordingly, the $N_2O$ formation levels and deNO$_x$ing performances of 1.6% $V_2O_5$-7.8% $WO_3$ catalysts supported on titanium dioxides ion-exchanged by iron ions in different contents at a sublimation temperature of 200° C. were examined. Their measuring methods were the same as described in detail above.

As it can be seen by Embodiments 6 to 10 in Table 5, 1.6% $V_2O_5$-7.8% $WO_3$/0.2% Fe—$TiO_2$-200 (Embodiment 6) having an iron ion content of 0.2 wt % had deNO$_x$ing performances similar to those of 1.6% $V_2O_5$-7.8% $WO_3$/$TiO_2$ (Comparative Example 1) but still exhibited a high $N_2O$ concentration, such as 47 to 85 ppm at 450 to 480° C.

TABLE 5

| Embodiment | Catalyst | DeNO$_x$ing efficiency (%) Reaction temperature (° C.) | | | | | | | Nitrous oxide concentration (ppm) Reaction temperature (° C.) | | | | | | |
|---|---|---|---|---|---|---|---|---|---|---|---|---|---|---|---|
| | | 200 | 250 | 300 | 350 | 400 | 450 | 480 | 200 | 250 | 300 | 350 | 400 | 450 | 480 |
| 6 | 1.6% $V_2O_5$-7.8% $WO_3$/0.2% Fe—$TiO_2$-200 | 37 | 83 | 98 | 99 | 100 | 93 | 80 | 0 | 0 | 0 | 3 | 10 | 47 | 85 |
| 7 | 1.6% $V_2O_5$-7.8% $WO_3$/0.5% Fe—$TiO_2$-200 | 35 | 82 | 95 | 99 | 100 | 91 | 78 | 0 | 0 | 0 | 1 | 4 | 7 | 9 |
| 8 | 1.6% $V_2O_5$-7.8% $WO_3$/1.74% Fe—$TiO_2$-200 | 34 | 84 | 96 | 99 | 100 | 90 | 77 | 0 | 0 | 0 | 0 | 3 | 6 | 8 |
| 9 | 1.6% $V_2O_5$-7.8% $WO_3$/5.02% Fe—$TiO_2$-200 | 37 | 86 | 97 | 98 | 100 | 87 | 73 | 0 | 0 | 0 | 0 | 3 | 5 | 6 |
| 10 | 1.6% $V_2O_5$-7.8% $WO_3$/7.04% Fe—$TiO_2$-200 | 35 | 81 | 95 | 98 | 100 | 70 | 50 | 0 | 0 | 0 | 0 | 2 | 5 | 7 |

It can be seen that the concentration of $N_2O$ formed has been remarkably reduced when the iron ion content is 0.5 to 7.04 wt % (Embodiments 7 to 10). However, as shown from the deNO$_x$ing performances of 1.6% $V_2O_5$-7.8% $WO_3$/7.04% Fe—TiO$_2$-200, if the content of ion-exchanged iron ions is too high, the deNO$_x$ing performances at high temperatures may be rather reduced, and thus it is not preferable (Embodiment 10).

Embodiments 11 to 14

Catalysts having different contents of vanadium pentoxide (0.2 to 5 wt % $V_2O_5$) were, using 7.8 wt % $WO_3$ supported on 3.15% Fe—TiO$_2$-200, prepared according to the same method as the preparation technique applied to the aforementioned embodiments. The $N_2O$ formation concentrations and deNO$_x$ing performances of the catalysts were evaluated by the same method as that provided in Embodiment 1.

As it can be shown by Embodiments 11 to 14 in Table 6, the $N_2O$ formation levels and deNO$_x$ing performances increased with an increase in vanadium pentoxide. Over the 4.3% $V_2O_5$-7.8% $WO_3$/3.15% Fe—TiO$_2$-200 catalyst having a high vanadium pentoxide content, low-temperature deNO$_x$ing performances were excellent but the concentration of $N_2O$ being formed at 400° C. or higher remarkably increased (Embodiment 14).

TABLE 6

| Embodiments | Catalyst | DeNO$_x$ing efficiency (%) Reaction temperature (° C.) | | | | | | | Nitrous oxide concentration (ppm) Reaction temperature (° C.) | | | | | | |
|---|---|---|---|---|---|---|---|---|---|---|---|---|---|---|---|
| | | 200 | 250 | 300 | 350 | 400 | 450 | 480 | 200 | 250 | 300 | 350 | 400 | 450 | 480 |
| 11 | 0.1% $V_2O_5$-7.8% $WO_3$/3.15% Fe—TiO$_2$-200 | 25 | 55 | 77 | 89 | 95 | 70 | 58 | 0 | 0 | 0 | 0 | 1 | 3 | 4 |
| 12 | 0.2% $V_2O_5$-7.8% $WO_3$/3.15% Fe—TiO$_2$-200 | 34 | 82 | 94 | 98 | 100 | 85 | 71 | 0 | 0 | 0 | 0 | 2 | 4 | 5 |
| 13 | 3% $V_2O_5$-7.8% $WO_3$/3.15% Fe—TiO$_2$-200 | 56 | 92 | 99 | 100 | 100 | 92 | 78 | 0 | 0 | 2 | 4 | 5 | 6 | 9 |
| 14 | 4.3% $V_2O_5$-7.8% $WO_3$/3.15% Fe—TiO$_2$-200 | 63 | 95 | 99 | 100 | 100 | 95 | 73 | 0 | 2 | 4 | 7 | 22 | 50 | 95 |

It can be seen that the 0.1% $V_2O_5$-7.8% $WO_3$/3.15% Fe—$TiO_2$-200 catalyst exhibited the lowest $N_2O$ formation level but was not suitable for an $NH_3$—SCR deNO$_x$ing catalyst because of its relatively low deNO$_x$ing performance compared to that of the other catalysts (Embodiment 12).

Embodiments 15 to 20

Catalysts containing 2 to 29.8 wt % tungsten trioxide were prepared by using 3.15% Fe—$TiO_2$-200 as a support and 1.6 wt % vanadium pentoxide, and their $N_2O$ formation levels and deNO$_x$ing performances in the $NH_3$—SCR deNO$_x$ing reaction were investigated as described above.

As shown in Table 7, when an amount of tungsten trioxide was 3 to 10.3 wt % (Embodiments 16 and 17), there was no significant difference not only in $N_2O$ concentrations but also in deNO$_x$ing performances (see Embodiment 1 in Table 1), and a maximum formation amount of $N_2O$ even at 480° C. was just 7 ppm.

TABLE 7

| | | DeNO$_x$ing efficiency (%) Reaction temperature (° C.) | | | | | | | Nitrous oxide concentration (ppm) Reaction temperature (° C.) | | | | | | |
|---|---|---|---|---|---|---|---|---|---|---|---|---|---|---|---|
| Embodiment | Catalyst | 200 | 250 | 300 | 350 | 400 | 450 | 480 | 200 | 250 | 300 | 350 | 400 | 450 | 480 |
| 15 | 1.6% $V_2O_5$-2% $WO_3$/3.15% Fe—$TiO_2$-200 | 26 | 43 | 62 | 78 | 83 | 74 | 69 | 0 | 0 | 0 | 0 | 3 | 3 | 6 |
| 16 | 1.6% $V_2O_5$-3% $WO_3$/3.15% Fe—$TiO_2$-200 | 34 | 82 | 90 | 95 | 100 | 85 | 70 | 0 | 0 | 0 | 0 | 3 | 4 | 7 |
| 17 | 1.6% $V_2O_5$-W.3% $WO_3$/3.15% Fe—$TiO_2$-200 | 37 | 88 | 98 | 100 | 100 | 91 | 77 | 0 | 0 | 0 | 1 | 3 | 5 | 6 |
| 18 | 1.6% $V_2O_5$-15.1% $WO_3$/3.15% Fe—$TiO_2$-200 | 38 | 89 | 99 | 100 | 100 | 92 | 83 | 0 | 0 | 1 | 9 | 14 | 8 | 6 |
| 19 | 1.6% $V_2O_5$-21.3% $WO_3$/3.15% Fe—$TiO_2$-200 | 38 | 90 | 99 | 100 | 100 | 95 | 88 | 0 | 0 | 2 | 12 | 25 | 9 | 7 |
| 20 | 1.6% $V_2O_5$-29.8% $WO_3$/3.15% Fe—$TiO_2$-200 | 38 | 92 | 100 | 100 | 100 | 99 | 90 | 0 | 0 | 2 | 15 | 31 | 9 | 7 |

When an amount of tungsten trioxide was 15.1 to 29.8 wt % (Embodiments 18 to 20), high-temperature deNO$_x$ing performances increased compared to those of 1.6% $V_2O_5$-7.8% $WO_3$/$TiO_2$ (Comparative Example 1) but $N_2O$ formation levels at 350 to 400° C. increased remarkably.

Since 1.6% $V_2O_5$-2% $WO_3$/3.15% Fe—$TiO_2$-200 has relatively low deNO$_x$ing performance in the whole reaction temperature range, it can be seen that it is not preferable as a deNO$_x$ing catalyst in spite of showing low $N_2O$ formation concentrations (Embodiment 15).

Although the preferable embodiments and non-preferable ones for implementing the present invention have been compiled above, not only is the present invention not limited thereto, but various modifications may also be made thereto unless they depart from the gist of the present invention.

Various changes and modifications may be made thereto by one of ordinary skill in the art, unless they depart from the technical spirit and scope of the claims. Accordingly, the scope of the present invention should be interpreted by the following claims which have been described to include such changes and modifications.

The invention claimed is:

1. A vanadium pentoxide-tungsten trioxide deNO$_x$ing catalyst supported on an iron ion-exchanged titanium dioxide for selectively removing nitrogen oxides from stationary sources using ammonia or urea as a reducing agent, wherein the iron ion-exchanged titanium dioxide support is prepared by modifying and functionalizing the surface of a bare titanium dioxide, mixing with a precursor of iron ions, and then exchanging with the iron ions at a sublimation temperature of the precursor using an ion-exchange technique.

2. The vanadium pentoxide-tungsten trioxide deNO$_x$ing catalyst supported on an iron ion-exchanged titanium dioxide of claim 1, wherein the iron ions are divalent iron ions.

3. The vanadium pentoxide-tungsten trioxide deNO$_x$ing catalyst supported on an iron ion-exchanged titanium dioxide of claim 1, wherein the surface of the titanium dioxide is functionalized with hydroxyl groups.

4. The vanadium pentoxide-tungsten trioxide deNO$_x$ing catalyst supported on an iron ion-exchanged titanium dioxide of claim 1, wherein the ion-exchange technique is solid-state ion exchange.

5. The vanadium pentoxide-tungsten trioxide deNO$_x$ing catalyst supported on an iron ion-exchanged titanium dioxide of claim 1, wherein the iron ions are included at 0.5 to 5 wt % with respect to the titanium dioxide.

6. The vanadium pentoxide-tungsten trioxide deNO$_x$ing catalyst supported on an iron ion-exchanged titanium dioxide of claim 2, wherein the iron ions are included at 0.5 to 5 wt % with respect to the titanium dioxide.

7. The vanadium pentoxide-tungsten trioxide deNO$_x$ing catalyst supported on an iron ion-exchanged titanium dioxide of claim 1, wherein the vanadium pentoxide is included at 0.2 to 3 wt % with respect to the titanium dioxide.

8. The vanadium pentoxide-tungsten trioxide deNO$_x$ing catalyst supported on an iron ion-exchanged titanium dioxide of claim 1, wherein the tungsten trioxide is included at 2 to 30 wt % with respect to the titanium dioxide.

9. The vanadium pentoxide-tungsten trioxide deNO$_x$ing catalyst supported on an iron ion-exchanged titanium dioxide of claim 1, wherein the supported vanadium pentoxide-tungsten trioxide deNO$_x$ing catalyst is able to reduce production levels of nitrous oxide as a byproduct in a removal reaction of nitrogen oxides.

10. A method for removing nitrogen oxides from a gas comprising contacting the gas with the vanadium pentoxide-tungsten trioxide deNO$_x$ing catalyst supported on an iron ion-exchanged titanium dioxide of claim 1.

* * * * *